F. M. DEVORE.
COW MILKER.
APPLICATION FILED OCT. 7, 1907.
913,108.
Patented Feb. 23, 1909.
3 SHEETS—SHEET 3.
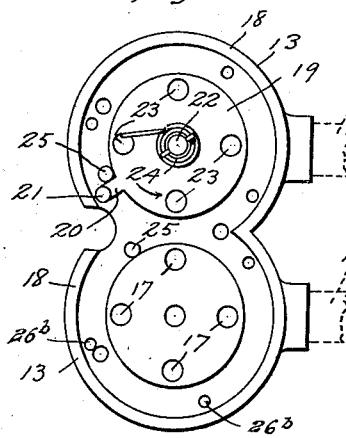
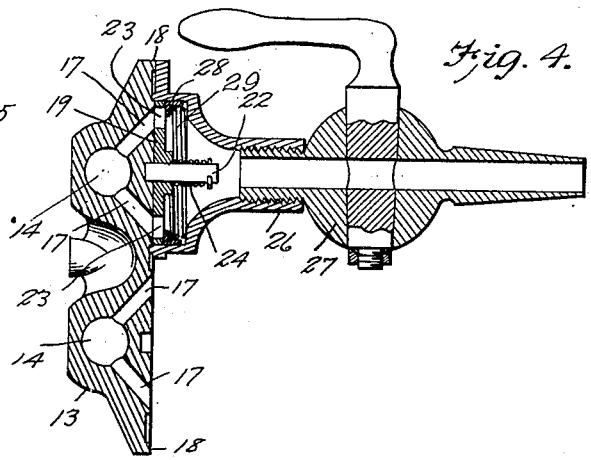
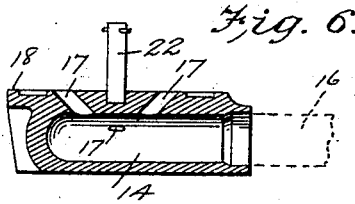
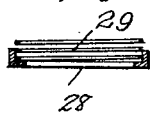
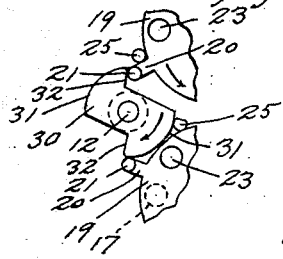
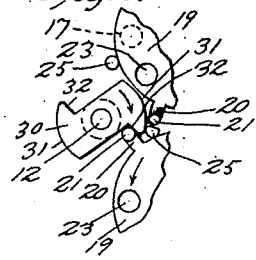
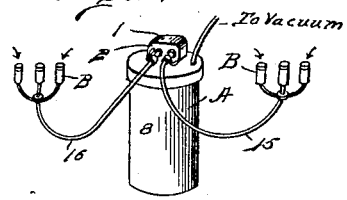
Witnesses
George Hilton
C. H. Griesbauer
Inventor
F. M. Devore,
by H. B. Willson &Co
Attorneys

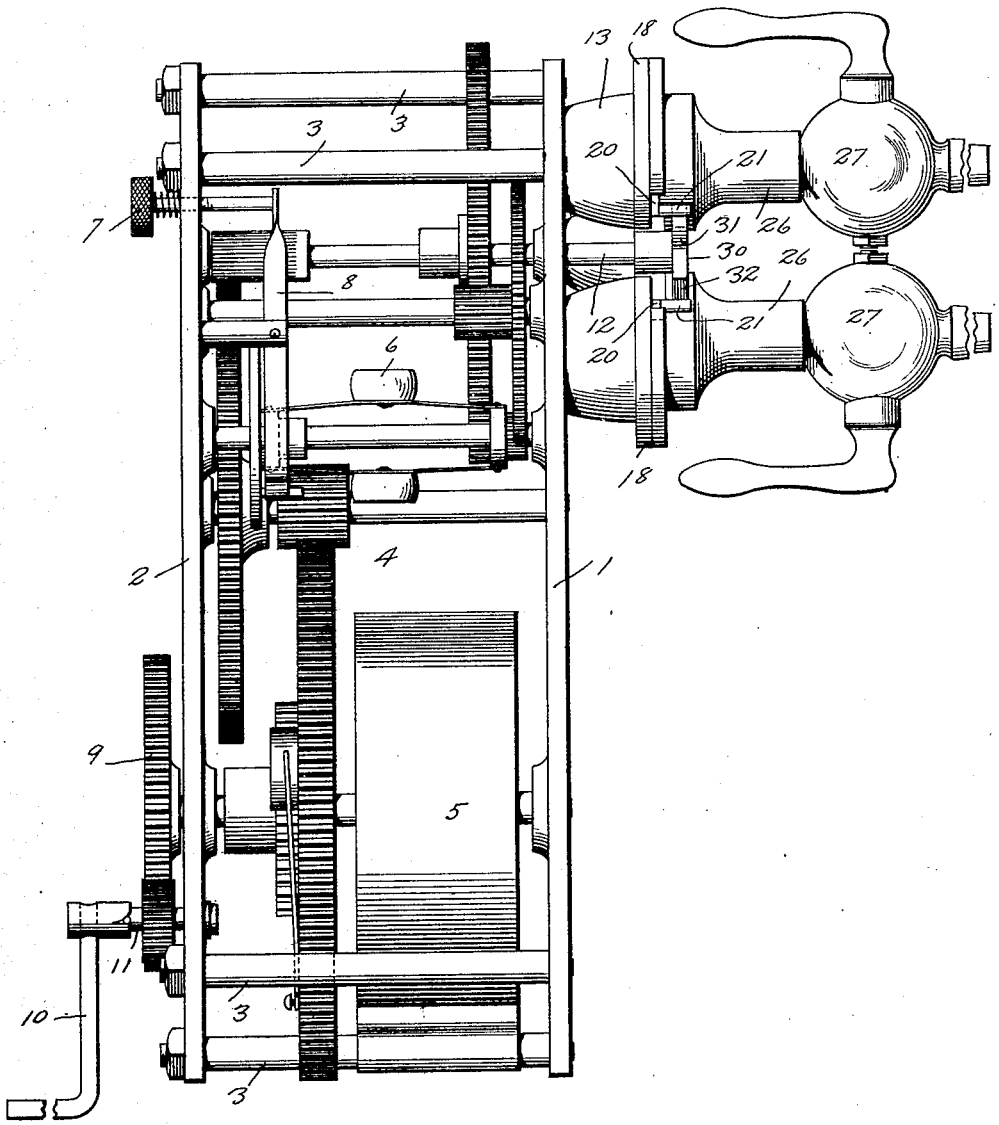

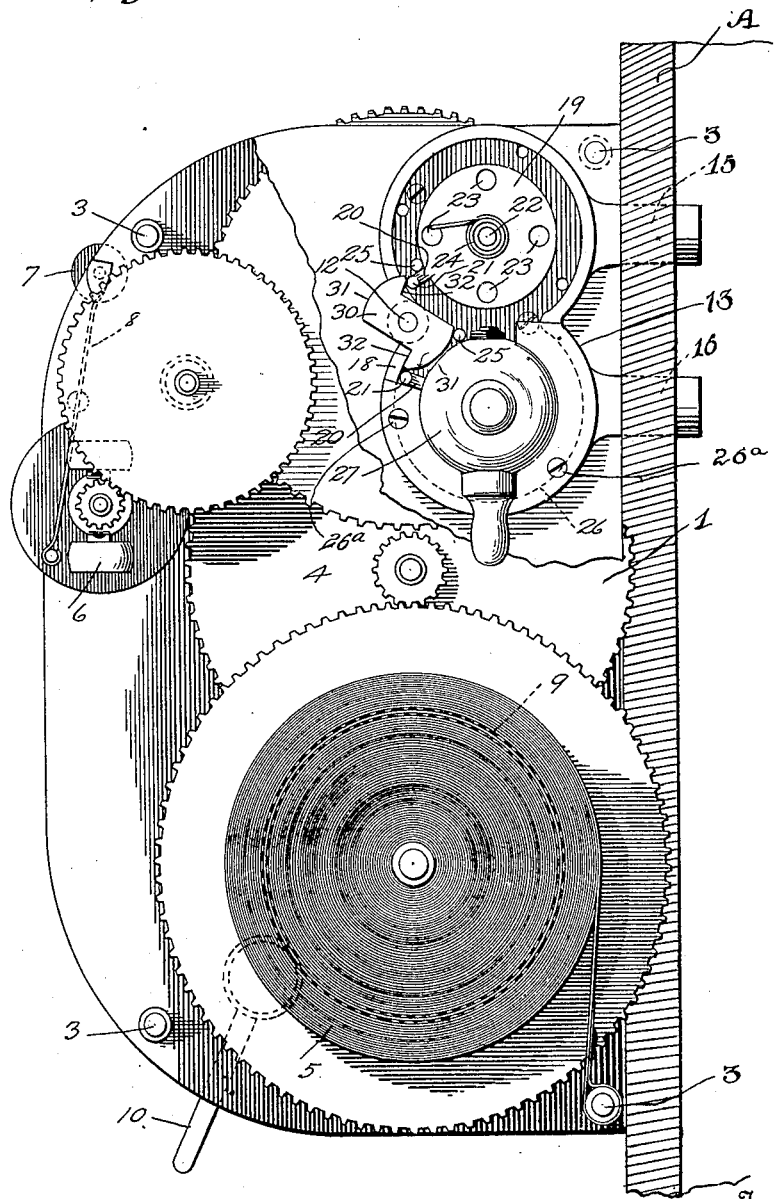

UNITED STATES PATENT OFFICE.

FRANCIS M. DEVORE, OF COUNCIL BLUFFS, IOWA, ASSIGNOR OF ONE-FOURTH TO EDWIN N. CAMPBELL AND ONE-FOURTH TO HERBERT J. UNDERWOOD, OF COUNCIL BLUFFS, IOWA.

COW-MILKER.

No. 913,108.  Specification of Letters Patent.  Patented Feb. 23, 1909.

Application filed October 7, 1907. Serial No. 396,304.

*To all whom it may concern:*

Be it known that I, FRANCIS M. DEVORE, a citizen of the United States, residing at Council Bluffs, in the county of Pottawattamie and State of Iowa, have invented certain new and useful Improvements in Cow-Milkers; and I do declare the following to be a full, clear, and exact description of the invention, such as will enable others skilled in the art to which it appertains to make and use the same.

This invention relates to cow milkers, and more particularly to that part of such devices which are known as "pulsators" for controlling the communication between the can or source of suction and the teat cups.

One of the objects of the invention is to provide a device which is adapted to be operated or controlled mechanically, as distinguished from what are known as "automatic pulsators."

Another object is to secure a progressive decrease of the pressure upon the teats by gradually closing the vacuum conduit and quickly relieving the vacuum by suddenly opening the conduit to its fullest extent.

Another object is to provide means for regulating or controlling the number of pulsations per minute.

With these and other objects in view, the invention comprises mechanism which will be simple, positive, and effective in its operation, and which can be controlled and manipulated, as will be hereinafter more fully set forth.

In the accompanying drawings, which illustrate one form or embodiment of the invention, Figure 1 is an edge elevation of the machine, with a portion thereof removed; Fig. 2 is a broken side elevation of the same; Fig. 3 is an enlarged plan view of the base of the valve mechanism, showing one of the valves in position; Fig. 4 is a longitudinal sectional view of the same; Fig. 5 is a sectional view of packing for the valve, and a side elevation of the spring for holding it in position; Fig. 6 is a transverse sectional view through one end of the base; Figs. 7 and 8 are broken detail views showing more particularly how the valves are actuated; Fig. 9 is a perspective view of the cam for actuating the valves; and Fig. 10 is a perspective view of my device complete, ready to be operated, the vacuum producing means only being omitted.

Referring more particularly to the drawings, which are for illustrative purposes only, and, therefore, are not drawn to any particular scale, 1 and 2 indicate the side pieces of a frame, and which are spaced apart by posts, 3, to form the main frame of the pulsator mechanism. Journaled within the frame is a train of gearing, 4, which is adapted to be actuated by any suitable source of power, as a spring, 5, although it is evident that it could be actuated by electricity or other suitable medium. The speed at which the mechanism is permitted to operate is controlled in any suitable manner, an ordinary frictional governor, 6, being shown which is adapted to be actuated by an ordinary screw, 7, which passes through one of the side pieces of the frame, and engages at its inner end with a lever, 8. When the spring is used it should have considerable strength, and is preferably wound by means of the gearing, 9, and a handle, 10, removably seated upon a post, 11. The frame is adapted to be secured to the ordinary can A in any desired manner, but the can and the means of connecting the frame therewith, form no part of the present invention. However, the can is preferably provided with two compartments, as by forming two semi-cylindrical cans which are removably placed in the outer compartment so that the milking apparatus from two cows may be secured upon the same casing, but each communicating with a separate milk receptacle, whereby each cow's milk may be kept separate and apart from the others.

Secured to one of the side pieces of the frame in any desired manner but preferably adjacent to the extended end of one of the shafts, as 12, of the train of gearing 4, is a base 13 which is provided with two sockets or recesses 14, the outer ends of which may receive milk discharge pipes 15 and 16 leading to the milk receptacle, said pipes being indicated by the dotted lines in Fig. 2. The outer face of the base over each of the recesses 14 is flat and provided with channels 17 which communicate with said recesses and the outer edge of each face is preferably provided with a rib or flange 18.

Seated upon each face of the base is a valve plate 19 having an arm 20 provided with a laterally projecting pin 21 whereby the valve is oscillated around a post 22 arising from the center of each valve seat. Said valve plates are also provided with series of perforations 23, which are moved into registration with the channels 17 of the base 13 by springs 24 disposed around the posts 22 which hold the arms 20 against stop pins 25 projecting from the base 13.

Removably secured to each end of the base over the valve plate thereon by means of screws 26ª and screw-holes 26ᵇ is a casing 26, which is preferably provided with a nipple as a means for connecting it with the tubes leading to the teat cups B, said nipple having a stop-cock 27 therein. Seated within each casing is a suitable packing, preferably in the form of a shouldered ring 28, which is yieldingly held in engagement with the top of the valve by means of the spring 29, in order to render the operation of the valve as nearly air tight as possible. It will be noticed that the ring 28 makes contact entirely upon the upper edge of the valve 19 and also around the inner face of the casing. The arms 20 of the two valve plates and the pins 21 are located adjacent to each other as shown more particularly in Figs. 7 and 8, whereby a suitable cam 30, which is mounted for rotation in the direction shown by the arrow of Figs. 7 and 8 on the extension of shaft 12, is adapted to engage with the pins 21 and successively move the two arms away from their respective stop pins 25. The cam 30 is formed double, being provided with two pin engaging lugs 31 and two curved retaining surfaces 32 and is revolved in such direction that the engaging lug contacts with the pin 21 and causes the valve plate to move its perforations 23 out of register with the channels 17, and as such pin passes out of engagement with the lug it is engaged and held by the succeeding curved surface, until with the continued rotation of the cam the pin slips from the end of such plate into the recess of the cam when the spring 24 turns the valve plate to bring its perforations 23 into registration with the channels 17. At such time the vacuum or exhaust pressure in the can acts throughout the tubes and teat cup, and thus a draw or suction is made upon the teats of the cow, the duration of which, however, is very short as the lug of the cam engages at once with the pin 21 and begins to move the plate to close the communication between the milk receptacle and the teat cups. There is thus provided a milking action in which the suction received is quickened to the maximum and is then gradually reduced to zero. The two valve plates and cam are arranged so that while one plate is being moved from maximum suction to zero, the other plate is held in zero position. Ordinarily, the proper speed with which each of the valves should be opened is forty times a minute, although it will be found necessary to vary the rate of speed for different cows upon which the apparatus is being used. When it is desired to stop the machine, as when being removed from a cow, the screw, 7, can be so adjusted as to cause the lever, 8, to bear against the governor with sufficient pressure to hold the mechanism from operating.

In using the pulsator as above described, the spring is wound up and the pulsator then placed in position and connections made with any suitable form of teat-cup 3 and the source of vacuum, the apparatus shown in the present drawings being adapted for what are known as "double chambered" milkers, in which a vacuum is formed for creating pressure in the cup, and also for relieving it. It is evident, though, that the mechanism could be adapted for any other form of vacuum-forming apparatus, or means for extracting the milk, by omitting one of the recesses, 14, and the valve mechanism for controlling the same. After the teat cups have been adjusted, the pulsator is put into operation by relieving the pressure upon the governor, and the cam caused to rotate with the desired speed so as to cause the valves to be closed with the desired rapidity to adapt the device for use upon the cow on which it is being used, and also to regulate the number of pulsations that shall occur in extracting the milk. At the same time, the degree of vacuum which it is found most desirable to use upon the cow being operated upon is controlled or regulated by means of the stop cock, 27, which opens communication with the air and thereby decreases the amount of vacuum to the desired extent.

From the foregoing it will be seen that the pulsating apparatus is very compact and easily secured in position and that it can be controlled or regulated by even a novice. The valve mechanism is very simple, and very efficient, and access can be had to it at any time by removing the cap, 26. The closing of the valve is effected gradually at any desired rate of speed, but its opening is substantially instantaneous thereby securing the greatest efficiency with the greatest possible speed.

Having thus fully described my invention, what I claim as new and desire to secure by Letters-Patent, is:

1. In a pulsator for cow milkers, a pair of valves for controlling the connection from the receptacle to the teat cups, springs to move said valves to open position, and a cam arranged to actuate the valves to gradually close the same and hold them closed for a limited period, said cam and valves being so arranged that one valve is held closed while the other is being moved from its open position to its closed position.

2. In a pulsator for cow milkers, a milk receptacle in which is maintained an exhaust or vacuum, teat cups, a connection between such receptacle and teat cups, such connection comprising a base plate having recesses communicating with the receptacle, casings secured to the plate and having nipples for communication with the teat cups, a pair of valve plates oscillatorily mounted on the base and arranged to control the communication between the milk receptacle and teat cups, springs to move such valve plates into open position and a cam arranged to actuate both of said plates, and so arranged that while one of said plates is being moved from maximum suction to zero the other of said plates is held at zero.

3. In a pulsator for cow milkers, a base provided with two recesses and having its outer face smooth and provided with channels communicating with said recesses, a pair of posts projecting from the outer face of the base, valve plates provided with series of perforations oscillatorily mounted upon said posts, springs around said posts to move said valve plates in open position and a cam arranged to actuate the valves to gradually close the same and hold them closed for a limited period.

4. In a pulsator for cow milkers, a recessed base provided in its outer face with channels communicating with said recesses, valve plates mounted upon said face and provided with extensions, pins at the outer ends of said extensions, stop pins adapted to be engaged by the projections for limiting the movement of the valve plates in that direction, a double ended cam for engaging with the pins of said extensions successively, said pins and cam being so arranged relatively to each other that one valve plate is held closed while the other is gradually moved from its open position to its closed position.

5. In combination with a milk receptacle in which is maintained an exhaust or vacuum, a pulsator comprising a base having recesses communicating with said receptacle and channels communicating with said recesses, valve plates provided with series of perforations to register with said channels, a casing over each valve plate provided with means for establishing communication with a set of teat cups, packing for each valve plate, a spring in each casing for yieldingly holding the packing of its valve plate in position and means for successively actuating said valves.

6. In a pulsator for cow milkers, a base provided with two recesses and having its outer face smooth and provided with channels communicating with said recesses, a pair of posts projecting from the outer face of the base, valve plates provided with series of perforations oscillatorily mounted upon said posts, springs around said posts to move said valve plates in open position, a cam arranged to actuate the valves to gradually close the same and hold them closed for a limited period, and a spring motor arranged to rotate said cam.

In testimony whereof I have hereunto set my hand in presence of two subscribing witnesses.

FRANCIS M. DEVORE.

Witnesses:
  H. C. HATTENHAUER,
  H. W. HAZELTON.